United States Patent
Peng et al.

(10) Patent No.: US 11,775,309 B2
(45) Date of Patent: Oct. 3, 2023

(54) EXCEPTION STACK HANDLING METHOD, SYSTEM, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Yang Peng, Beijing (CN); Hao Yang, Beijing (CN); Jing Zou, Beijing (CN); Lei Feng, Beijing (CN); Hongliang Sui, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 297 days.

(21) Appl. No.: 17/423,144

(22) PCT Filed: Nov. 26, 2020

(86) PCT No.: PCT/CN2020/131660
§ 371 (c)(1),
(2) Date: Jul. 15, 2021

(87) PCT Pub. No.: WO2021/232729
PCT Pub. Date: Nov. 25, 2021

(65) Prior Publication Data
US 2022/0342674 A1    Oct. 27, 2022

(30) Foreign Application Priority Data

May 22, 2020  (CN) .......................... 202010440251.7

(51) Int. Cl.
G06F 9/44    (2018.01)
G06F 9/38    (2018.01)
G06F 9/54    (2006.01)

(52) U.S. Cl.
CPC ............ *G06F 9/3861* (2013.01); *G06F 9/546* (2013.01); *G06F 2209/547* (2013.01)

(58) Field of Classification Search
CPC ..................................................... G06F 9/3861
(Continued)

(56) References Cited

U.S. PATENT DOCUMENTS 8,949,660 B1   2/2015  Pupius et al.
9,830,478 B1   11/2017 Hale
(Continued)

FOREIGN PATENT DOCUMENTS

CA    3026281 A1   12/2017
CN    108647329 A  10/2018
(Continued)

OTHER PUBLICATIONS

Search Report of CN2020104402517 dated Jun. 1, 2021, 2 pages.
(Continued)

*Primary Examiner* — Timothy A Mudrick
(74) *Attorney, Agent, or Firm* — Brooks Kushman P.C.

(57) ABSTRACT

The present disclosure provides an exception stack handling method, system, electronic device and storage medium and relates to the field of mobile Internet. The method may include: at the level of any executor in a distributed stream-type processing system including at least two executors, performing the following processing of: obtaining at least one exception stack from a message middleware when the executor in an idle state each time, collected exception stacks generated by users being stored in the message middleware; as for any exception stack, obtaining an anti-obfuscation map file corresponding to the exception stack, and performing anti-obfuscation processing for the excep-
(Continued)

tion stack by using the anti-obfuscation map file. The solution of the present disclosure may be applied to improve the processing speed.

18 Claims, 4 Drawing Sheets

(58) Field of Classification Search
USPC .................................................. 719/314
See application file for complete search history.

(56) References Cited

U.S. PATENT DOCUMENTS

| 2015/0205961 | A1* | 7/2015 | Franklin | H04L 63/0209 726/11 |
|---|---|---|---|---|
| 2019/0286551 | A1* | 9/2019 | Volckaert | G06F 11/362 |
| 2020/0004963 | A1* | 1/2020 | Zheng | G06F 21/562 |
| 2021/0149788 | A1* | 5/2021 | Downie | G06F 11/3604 |

FOREIGN PATENT DOCUMENTS

| CN | 109032909 | A | 12/2018 |
|---|---|---|---|
| CN | 111737661 | A | 10/2020 |
| JP | 2003039745 | A | 2/2003 |
| JP | 2005196680 | A | 7/2005 |
| JP | 2008003915 | A | 1/2008 |
| JP | 2010129080 | A | 6/2010 |
| JP | 2011002889 | A | 1/2011 |
| JP | 2013061843 | A | 4/2013 |
| WO | 2007137278 | A2 | 11/2007 |
| WO | 2014136228 | A | 9/2014 |

OTHER PUBLICATIONS

International Search Report of PCTCN2020131660 dated Mar. 4, 2021, 11 pages.

Hu, Yue, The design of Android application automatic test tool based on Monkey and DroidBot, Wanfang Data Platform, May 19, 2020, 4 pages.

Qiu, Jing, Software Security Oriented Binary Code Reverse Analysis, Wanfang Data Platform, Aug. 18, 2017.

Notice of Reasons of Refusal of Japanese application No. 2022-534451 dated Jun. 20, 2023, 2 pages.

* cited by examiner

EXCEPTION STACK HANDLING METHOD, SYSTEM, ELECTRONIC DEVICE AND STORAGE MEDIUM

CROSS-REFERENCE TO RELATED APPLICATION

This application is the national phase of PCT Application No. PCT/CN2020/131660 filed on Nov. 26, 2020, which claims priority to Chinese Patent Application No. 202010440251.7, filed on May 22, 2020, which are hereby incorporated in their entireties by reference herein.

FIELD OF THE DISCLOSURE

The present disclosure relates to computer application technologies, and particularly to an exception stack handling method, system, electronic device and storage medium in the field of mobile Internet.

BACKGROUND OF THE DISCLOSURE

APPs on a user's mobile phone might crash or stutter sometimes due to various indefinite factors such as network, mobile phone performance and iterative release of new functions of APPs.

To prevent other persons from obtaining an item source code by decompiling after the item is packaged into an application kit (APK), an Android application vendor usually performs obfuscation processing for the item source code.

In the convention processing manner, after obtaining a reported exception stack caused by the crash or stutter of Android APP, an anti-obfuscation World Wide Web (web) server will perform anti-obfuscating processing for the exception stack, and then return a processing result back to a developer for data analysis. However, this processing manner has a slow processing speed and is only applicable for the processing of a small portion of users.

SUMMARY OF THE DISCLOSURE

The present disclosure provides an exception stack handling method, system, electronic device and storage medium.

A method for handling exception stack, including:
at the level of any executor in a distributed stream-type processing system comprising at least two executors, performing the following processing of:
obtaining at least one exception stack from a message middleware when the executor in an idle state each time, collected exception stacks generated by users being stored in the message middleware;
as for any exception stack, obtaining an anti-obfuscation map file corresponding to the exception stack, and performing anti-obfuscation processing for the exception stack by using the anti-obfuscation map file.

A system for exception handling stack which is a distributed stream-type processing system, wherein the system includes: at least two executors which each includes: an obtaining module and a processing module;
the obtaining module is configured to obtain at least one exception stack from a message middleware when the executor in an idle state each time, collected exception stacks generated by users being stored in the message middleware;
the processing module is configured to, as for any exception stack, obtain an anti-obfuscation map file corresponding to the exception stack, and perform anti-obfuscation processing for the exception stack by using the anti-obfuscation map file.

An electronic device, including:
at least one processor; and
a memory communicatively connected with the at least one processor; wherein,
the memory stores instructions executable by the at least one processor, and the instructions are executed by the at least one processor to enable the at least one processor to execute the above method.

A non-transitory computer-readable storage medium storing computer instructions therein, wherein the computer instructions are used to cause the computer to execute the above method.

An embodiment in the present disclosure has the following advantages or beneficial effects: the exception stacks generated by users may be collected into the message middleware; when each executor in the distributed stream-type processing system is in the idle state each time, the executor may obtain at least one exception stack from the message middleware and perform anti-obfuscation processing. That is, the executors may perform anti-obfuscation processing for the exception stacks in parallel, thereby enhancing the processing speed, performing anti-obfuscation processing for all users' exception stacks, and thereby providing fuller processing result data for developers so that the developer performs more effective and reasonable data analysis.

It will be appreciated that the Summary part does not intend to indicate essential or important features of embodiments of the present disclosure or to limit the scope of the present disclosure. Other features of the present disclosure will be made apparent by the following description.

BRIEF DESCRIPTION OF DRAWINGS

The figures are intended to facilitate understanding the solutions, not to limit the present disclosure. In the figures.

DETAILED DESCRIPTION OF PREFERRED EMBODIMENTS

Exemplary embodiments of the present disclosure are described below with reference to the accompanying drawings, include various details of the embodiments of the present disclosure to facilitate understanding, and should be considered as being only exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

In addition, it should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
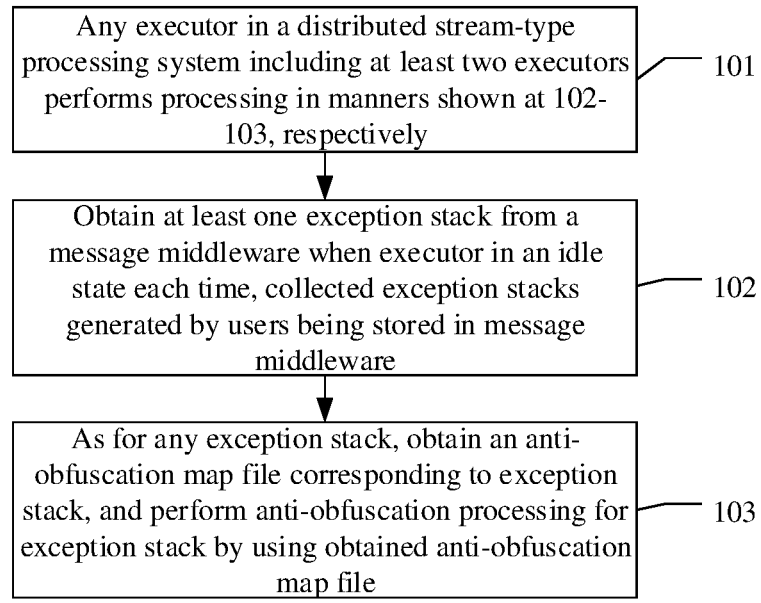
FIG. 1 illustrates a flow chart of a method for handling exception stack according to an embodiment of the present disclosure.

FIG. 1 illustrates a flow chart of a method for handling exception stack according to an embodiment of the present disclosure. As shown in FIG. 1, the following specific implementation mode is included.

At 101, any executor in a distributed stream-type processing system including at least two executors performs processing in manners shown at 102-103, respectively.

At 102, at least one exception stack is obtained from a message middleware when in an idle state each time, collected exception stacks generated by users being stored in the message middleware.

At 103, as for any exception stack, obtain an anti-obfuscation map file corresponding to the exception stack, and perform anti-obfuscation processing for the exception stack by using obtained anti-obfuscation map file.

In the present embodiment, the collected exception stacks generated by users may be stored in the message middleware. Preferably, when a mobile terminal log (e.g., crash log or stutter log) is stored in a magnetic disk in a log medial platform, the crash or stutter log may be written into the message middleware by scanning the stored file, i.e., the exception stack is written into the message middleware. The message middleware may be Kafka or the like.

The distributed stream-type processing system may be a distributed stream-type processing system with structured streaming of a Spark cluster as a core. The distributed stream-type processing system may include a plurality of executors. The specific number of executors may be set according to actual needs. The executors may subscribe to the message middleware, to pull the exception stack therein for processing and then write it into a storage system such as an Elastic Search (ES) system.

When in an idle state each time, each executor may pull at least one exception stack from the message middleware. The specific number of the exception stacks may be set according to actual needs, e.g., the exception stacks may be pulled on a first-in-first-out basis. An anti-obfuscation map file corresponding to the exception stack may be obtained for any pulled exception stack, and anti-obfuscation processing may be performed for the exception stack by using the obtained anti-obfuscation map file, to write the processing result into the storage system. If the executor pulls a plurality of exception stacks one time, the exception stacks may be processed in turn, or a plurality of threads may be activated to process the exception stacks in parallel. The specific processing manner is not limited. After the processing of the pulled exception stacks is completed, it may be believed that the executor is in the idle state to pull the exception stack again.

That is, the executors may perform anti-obfuscation processing for the exception stacks in parallel, thereby enhancing the processing speed, performing anti-obfuscation processing for all users' exception stacks, and thereby providing fuller processing result data for developers so that the developer performs more effective and reasonable data analysis.

In the distributed stream-type processing system, the system might also be confronted with conditions such as crash or reset, so the system is required to have idempotence in the processing of the data (exception stack), i.e., precisely consume data one time. It is possible to ensure through a checkpoint mechanism that the data is consumed at least once. In the storage system, the data is distinguished through the id. Even though one piece of data is consumed multiple times, it is stored only once, thereby ensuring the idempotence requirement of the entire system.

In the overall design, the processing and collection of the exception stacks is decoupled through the message middleware. During peak traffic period, the exception stacks that are not depleted will stored in the magnetic disk of the message middleware. The duration of the peak traffic period is usually short. Upon completion of the peak traffic period, the exception stacks accumulated in the message middleware may all be processed in time, thereby achieving better control of the pressure.

When obtaining the anti-obfuscation map file corresponding to the exception stack and performing the anti-obfuscation processing for the exception stack by using the obtained anti-obfuscation map file, the executor may first determine whether a local memory stores a desired anti-obfuscation map file, and if YES, use the anti-obfuscation map file stored in the local memory to perform the anti-obfuscation processing for the exception stack. In the prior art, the anti-obfuscation web server will obtain the anti-obfuscation map file pre-stored on the server magnetic disk, and use the anti-obfuscation map file to perform anti-obfuscation processing for the exception stack, and the read/write speed of the memory is by far larger than that of the magnetic disk. As such, obtaining the anti-obfuscation map file from the local memory and perform anti-obfuscation processing may significantly improve the processing speed. How to perform anti-obfuscation processing is of prior art.

If it is determined that the desired anti-obfuscation map file is not stored in the local memory, but the predetermined server stores the desired anti-obfuscation map file, the desired anti-obfuscation map file may be obtained from the predetermined server, and anti-obfuscation processing may be performed for the exception stack by using the obtained anti-obfuscation map file.

If it is determined that the desired anti-obfuscation map file is not stored in the local memory, and the predetermined server does not store the desired anti-obfuscation map file, the desired anti-obfuscation map file may be obtained from a predetermined platform, and anti-obfuscation processing may be performed for the exception stack by using the obtained anti-obfuscation map file.

The predetermined server may be a Remote Dictionary Server (Redis) server employing a Key-Value data storage form. The predetermined platform may be a grayscale platform, namely, an internal platform of a company.

It can be seen that the present embodiment provides a multi-stage storage mechanism, thereby ensuring that the executor obtains the desired anti-obfuscation map file in time and thereby improving a success rate of the anti-obfuscation processing.

Figure 2:
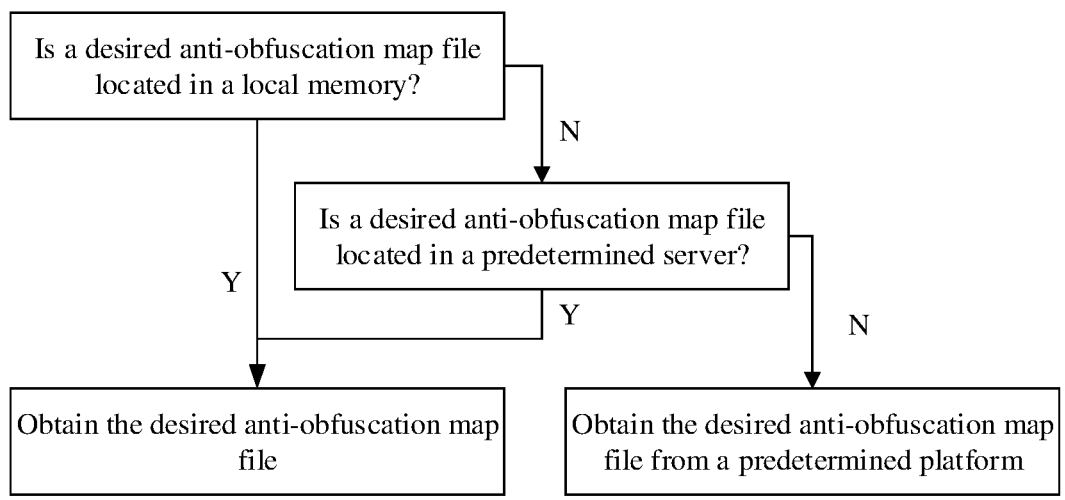
FIG. 2 illustrates a schematic diagram of a logic order of obtaining an anti-obfuscation map file according to the present disclosure.

If the desired anti-obfuscation map file is stored in the local memory, the anti-obfuscation map file stored in the local memory is used; if the desired anti-obfuscation map file is not stored in the local memory but stored in the predetermined server, the anti-obfuscation map file stored in the predetermined server is used; If the desired anti-obfuscation map file is not stored in both the local memory and the predetermined server, the anti-obfuscation map file stored in the predetermined platform is used. Correspondingly, the processing speed will get slower in turn. Therefore, it is possible to preferably use the anti-obfuscation map file stored in the local memory, then use the anti-obfuscation map file stored in the predetermined server, and finally use the anti-obfuscation map file stored in the predetermined platform. Based on the above introduction, FIG. 2 illustrates a schematic diagram of a logic order of obtaining the anti-obfuscation map file according to the present disclosure.

After the desired anti-obfuscation map file is obtained from the predetermined server, the anti-obfuscation map file may further be stored in the local memory if is determined that the anti-obfuscation map file meets a storage condition. After the desired anti-obfuscation map file is obtained from the predetermined server, the anti-obfuscation map file may be stored in the predetermined server, and the anti-obfuscation map file may further be stored in the local memory if is determined that the anti-obfuscation map file meets the storage condition.

There is no restriction on a specific condition specifically meant by the storage condition. For example, the condition may mean that there exists an idle storage space, or mean that a predetermined replacement policy is satisfied. The predetermined replacement policy may be a W-TinyLFU replacement policy.

The anti-obfuscation map file is stored in the local memory so that when the anti-obfuscation map file needs to be used again subsequently, it may be directly obtained from the local memory, thereby enhancing the anti-obfuscation processing speed. In addition, loss of the data in the memory upon resetting a real-time program after it shuts down may be prevented by storing the anti-obfuscation map file in the predetermined server.

In addition, if any anti-obfuscation map file in the local memory is not used within a predetermined duration, the anti-obfuscation map file may be deleted from the local memory, and/or, when the anti-obfuscation map file is stored in the local memory, the anti-obfuscation map file to be replaced may be determined according to the predetermined replacement policy, and the anti-obfuscation map file to be replaced may be deleted from the local memory. The specific value of the predetermined duration may be set according to actual needs.

The storage space (capacity) of the local memory is limited. It is possible to, in the above manner, try to ensure that the frequently-used anti-obfuscation map file stays in the local memory, thereby improving the hit rate of anti-obfuscation map file in the local memory, and thereby improving the anti-obfuscation processing speed. In addition, the local memory has a high concurrency capability and supports parallel read/write that do not interfere with each other.

When the anti-obfuscation map file is stored in the local memory, the anti-obfuscation map file may be mapped into a form of M sets of HashMap, M being a positive integer greater than one. Correspondingly, when the anti-obfuscation processing is performed for the exception stack by using the anti-obfuscation map file stored in the local memory, the anti-obfuscation map file after the parsing may be used to perform the anti-obfuscation processing for the exception stack.

Figure 3:
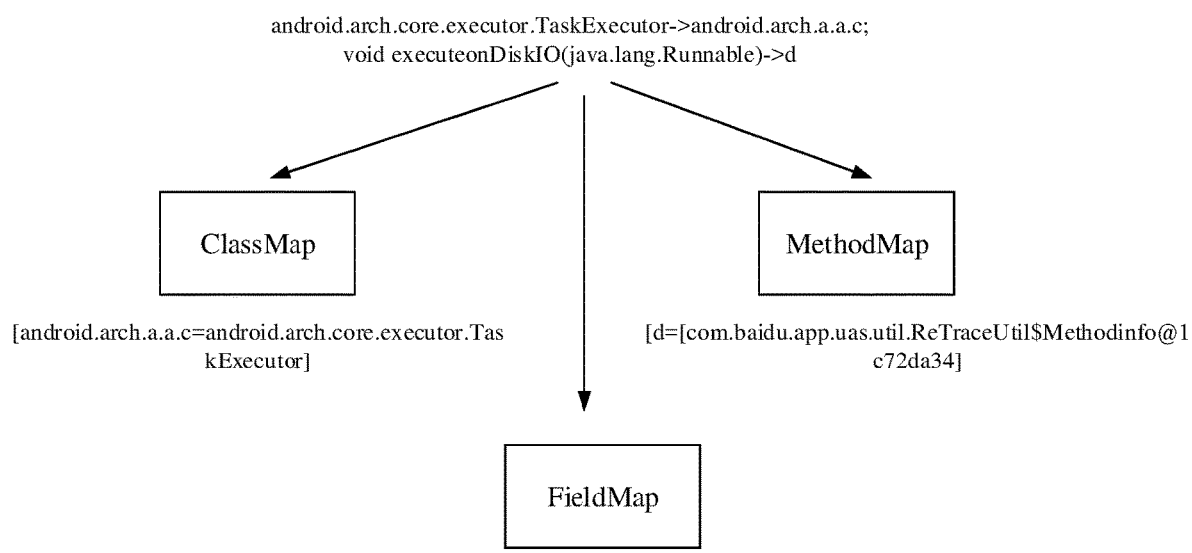
FIG. 3 illustrates a schematic diagram of the anti-obfuscation map file after parsing according to the present disclosure.

FIG. 3 illustrates a schematic diagram of the anti-obfuscation map file after parsing according to the present disclosure. As shown in FIG. 3, the anti-obfuscation map file may be parsed into a form of three sets of HashMap: ClassMap, FieldMap and MethodMap, respectively.

That is, the anti-obfuscation map file in the format of a plain text is divided and mapped into data structures of multiple sets of HashMap, and time complexity is reduced from O(N) to O(1), thereby further improving the anti-obfuscation processing speed.

Figure 4:
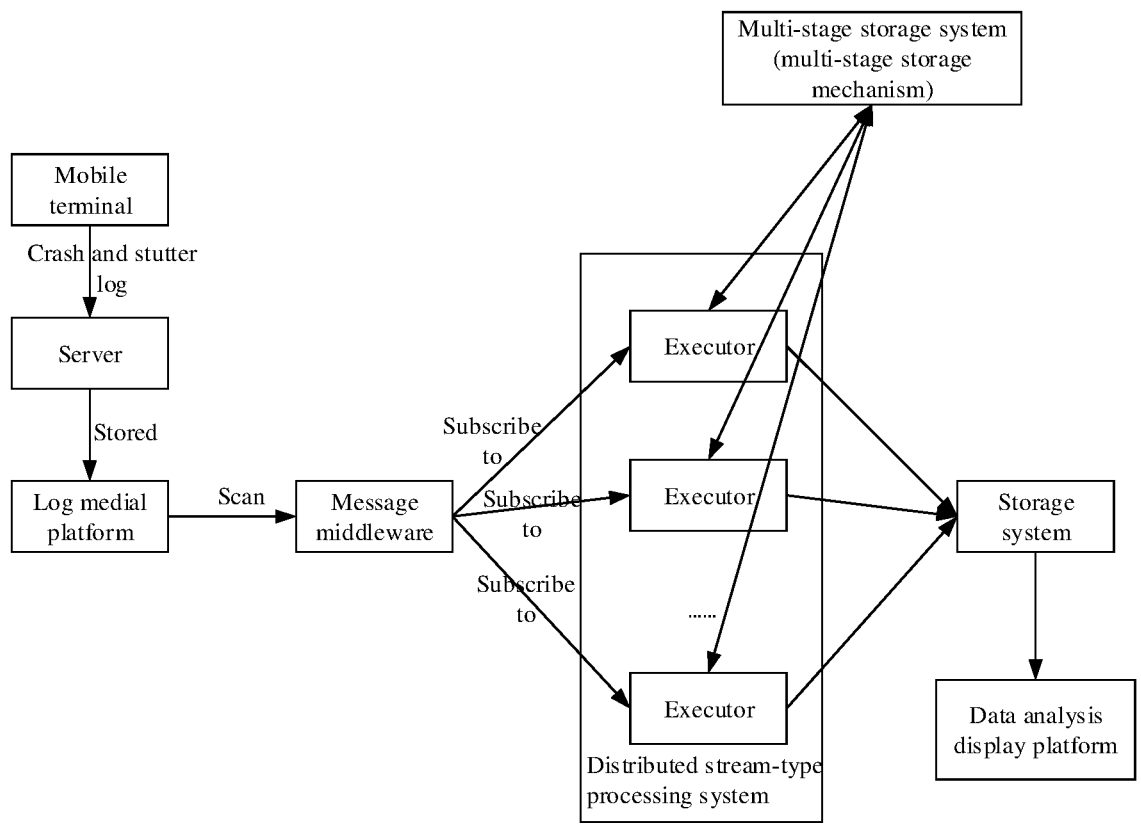
FIG. 4 illustrates a schematic diagram of a whole implementation process of the method for handling exception stack according to the present disclosure.

In view of the above introduction, FIG. 4 illustrates a schematic diagram of a whole implementation process of the method for handling exception stack according to the present disclosure. As shown in FIG. 4, the processing result stored in the storage system may be displayed to the developer via a data analysis display platform to help the developer to perform subsequent processing. Reference may be made to the above related depictions for other implementations, and detailed depictions will not be presented herein any more.

It should be noted that, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

The method embodiment is introduced above. The solution of the present disclosure will be further described hereunder through a system embodiment.

Figure 5:
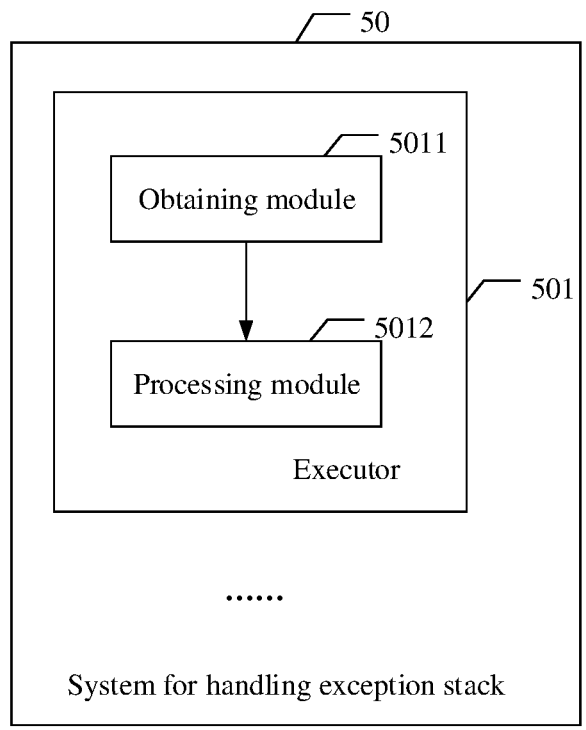
FIG. 5 illustrates a structural schematic diagram of an embodiment 50 of a system for handling exception stack according to the present disclosure.

FIG. 5 illustrates a structural schematic diagram of an embodiment 50 of a system for handling exception stack according to the present disclosure. The system may be distributed stream-type processing system and may include: at least two executors 501 (FIG. 5 only shows one executor 501 to simplify the figure), and each executor 501 may include: an obtaining module 5011 and a processing module 5012.

The obtaining module 5011 is configured to obtain at least one exception stack from a message middleware when the executor in an idle state each time, collected exception stacks generated by users being stored in the message middleware.

The processing module 5012 is configured to, as for any exception stack, obtain an anti-obfuscation map file corresponding to the exception stack, and perform anti-obfuscation processing for the exception stack by using obtained anti-obfuscation map file, and write a processing result into a storage system.

As for the exception stack, if the processing module 5012 determines that a corresponding anti-obfuscation map file is stored in the local memory, the processing module 5012 performs anti-obfuscation processing for the exception stack by using the anti-obfuscation map file stored in the local memory. If the processing module 5012 determines that a corresponding anti-obfuscation map file is not stored in the local memory but stored in a predetermined server, the processing module 5012 may obtain the anti-obfuscation map file from the predetermined server, and use the obtained anti-obfuscation map file to perform anti-obfuscation processing for the exception stack. If the processing module 5012 determines that a corresponding anti-obfuscation map file is not stored in both the local memory and the predetermined server, the processing module 5012 may obtain the corresponding anti-obfuscation map file from a predetermined platform, and use the obtained anti-obfuscation map file to perform anti-obfuscation processing for the exception stack.

After obtaining the anti-obfuscation map file from the predetermined server, the processing module 5012 may further store the anti-obfuscation map file in the local memory if determining that the anti-obfuscation map file meets a storage condition.

After obtaining the anti-obfuscation map file from the predetermined platform, the processing module 5012 may store the anti-obfuscation map file in the predetermined server, and further store the anti-obfuscation map file in the local memory if determining that the anti-obfuscation map file meets a storage condition.

In addition, if the processing module 5012 determines that any anti-obfuscation map file in the local memory is not used within a predetermined duration, the processing module 5012 may delete the anti-obfuscation map file from the local memory, and/or, when the anti-obfuscation map file is stored in the local memory, determine an anti-obfuscation map file to be replaced according to a predetermined replacement policy, and delete the anti-obfuscation map file to be replaced from the local memory.

Furthermore, the processing module 5012 may map the anti-obfuscation map file into a form of M sets of HashMap and then store M sets of HashMap into the local memory, M being a positive integer greater than one. Correspondingly, the anti-obfuscation map file after the parsing may be used to perform the anti-obfuscation processing for the exception stack.

Reference may be made to corresponding depictions in the aforesaid method embodiment for a specific workflow of the system embodiment shown in FIG. 5. The workflow is not detailed for the sake of concise.

In summary, according to the solution stated in the system embodiment in the present disclosure, the exception stacks generated by users may be collected into the message middleware; when each executor in the distributed stream-type processing system is in the idle state each time, the executor may obtain at least one exception stack from the message middleware and perform anti-obfuscation processing. That is, the executors may perform anti-obfuscation processing for the exception stacks in parallel, thereby enhancing the processing speed, performing anti-obfuscation processing for all users' exception stacks, and thereby providing fuller processing result data for developers so that the developer performs more effective and reasonable data analysis. In addition, the present disclosure provides a multi-stage storage mechanism, thereby ensuring that the executor obtains the desired anti-obfuscation map file in time and thereby improving a success rate of the anti-obfuscation processing; it is possible to preferably obtain the anti-obfuscation map file from the local memory to perform anti-obfuscation processing and thereby further improve the processing speed; if the anti-obfuscation map file is obtained from outside the local memory, the obtained anti-obfuscation map file may be stored in the local memory so that when the anti-obfuscation map file needs to be used again subsequently, it may be directly obtained from the local memory, thereby further enhancing the anti-obfuscation processing speed. In addition, loss of the data in the memory upon resetting a real-time program after it shuts down may be prevented by storing the anti-obfuscation map file obtained from the predetermined platform in the predetermined server. It is possible to, by managing the local memory, try to ensure that the frequently-used anti-obfuscation map file stays in the local memory, thereby improving the hit rate of anti-obfuscation map file in the local memory, and thereby improving the anti-obfuscation processing speed. In addition, the anti-obfuscation map file in the format of a plain text may be divided and mapped into data structures of multiple sets of HashMap, and time complexity may be reduced, thereby further improving the anti-obfuscation processing speed.

According to embodiments of the present disclosure, the present disclosure further provides an electronic device and a readable storage medium.

Figure 6:
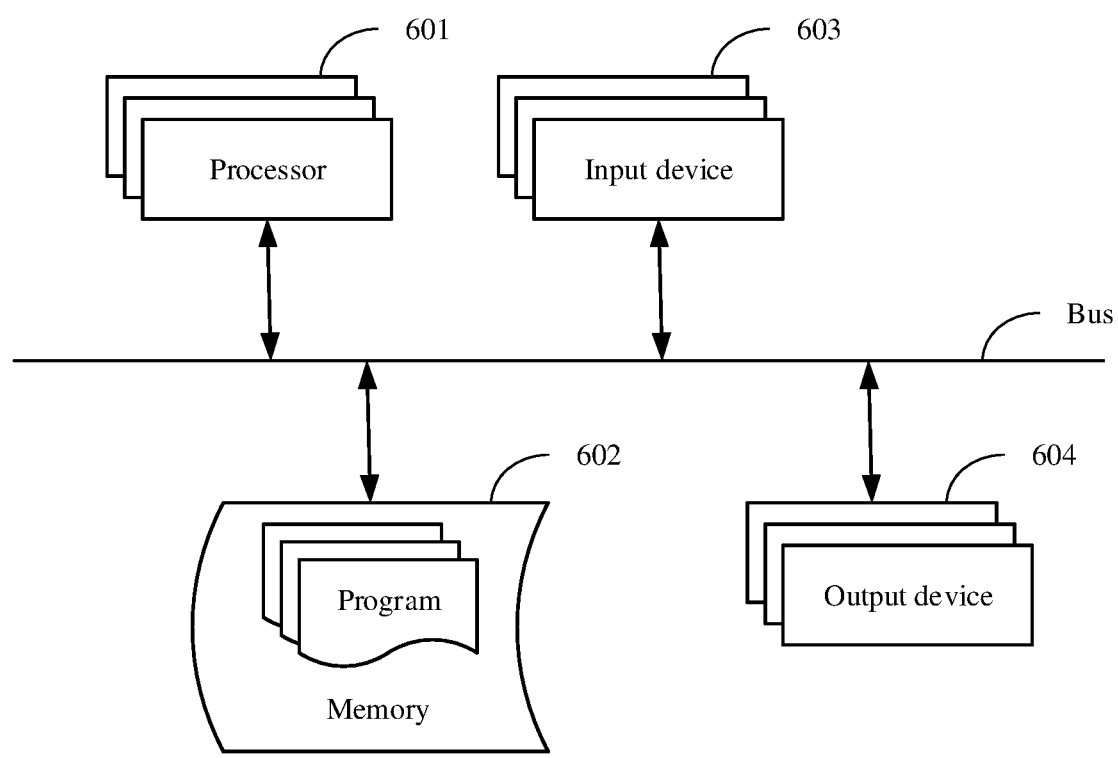
FIG. 6 illustrates a block diagram of an electronic device for implementing the method according to embodiments of the present disclosure.

As shown in FIG. 6, it shows a block diagram of an electronic device for implementing the method according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 6, the electronic device comprises: one or more processors 601, a memory 602, and interfaces configured to connect components and including a high-speed interface and a low speed interface. Each of the components are interconnected using various buses, and may be mounted on a common motherboard or in other manners as appropriate. The processor can process instructions for execution within the electronic device, including instructions stored in the memory or on the storage device to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 601 is taken as an example in FIG. 6.

The memory 602 is a non-transitory computer-readable storage medium provided by the present disclosure. The memory stores instructions executable by at least one processor, so that the at least one processor executes the method according to the present disclosure. The non-transitory computer-readable storage medium of the present disclosure stores computer instructions, which are used to cause a computer to execute the method according to the present disclosure.

The memory 602 is a non-transitory computer-readable storage medium and can be used to store non-transitory software programs, non-transitory computer executable programs and modules, such as program instructions/modules corresponding to the method in embodiments of the present disclosure. The processor 601 executes various functional applications and data processing of the server, i.e., implements the method in the above method embodiments, by running the non-transitory software programs, instructions and modules stored in the memory 602.

The memory 602 may include a storage program region and a storage data region, wherein the storage program region may store an operating system and an application program needed by at least one function; the storage data region may store data created according to the use of the electronic device. In addition, the memory 602 may include a high-speed random access memory, and may also include a non-transitory memory, such as at least one magnetic disk storage device, a flash memory device, or other non-transitory solid-state storage device. In some embodiments, the memory 602 may optionally include a memory remotely arranged relative to the processor 601, and these remote memories may be connected to the electronic device through a network. Examples of the above network include, but are not limited to, the Internet, an intranet, a blockchain network, a local area network, a mobile communication network, and combinations thereof.

The electronic device may further include an input device 603 and an output device 604. The processor 601, the memory 602, the input device 603 and the output device 604 may be connected through a bus or in other manners. In FIG. 6, the connection through the bus is taken as an example.

The input device 603 may receive inputted numeric or character information and generate key signal inputs related to user settings and function control of the electronic device, and may be an input device such as a touch screen, keypad, mouse, trackpad, touchpad, pointing stick, one or more mouse buttons, trackball and joystick. The output device 604 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network, a wide area network, a block chain network, and the Internet.

The computing system may include clients and servers. A client and server are generally remote from each other and typically interact through a communication network. The relationship of client and server arises by virtue of computer programs running on the respective computers and having a client-server relationship to each other.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method for handling exception stack, comprising:
   at the level of any executor in a distributed stream-type processing system comprising at least two executors, performing the following processing of:
   obtaining at least one exception stack from a message middleware when the executor in an idle state each time, collected exception stacks generated by users being stored in the message middleware;
   as for any exception stack, obtaining an anti-obfuscation map file corresponding to the exception stack, and performing anti-obfuscation processing for the exception stack by using the anti-obfuscation map file.

2. The method according to claim 1, wherein
   the obtaining an anti-obfuscation map file corresponding to the exception stack, and performing anti-obfuscation processing for the exception stack by using the anti-obfuscation map file comprises:
   if determining that the anti-obfuscation map file is stored in a local memory, performing anti-obfuscation processing for the exception stack by using the anti-obfuscation map file stored in the local memory.

3. The method according to claim 1, wherein
   the obtaining an anti-obfuscation map file corresponding to the exception stack, and performing anti-obfuscation processing for the exception stack by using the anti-obfuscation map file comprises:

if determining that the anti-obfuscation map file is not stored in the local memory but stored in a predetermined server, obtaining the anti-obfuscation map file from the predetermined server, and using the anti-obfuscation map file to perform anti-obfuscation processing for the exception stack;

if determining that the anti-obfuscation map file is not stored in both the local memory and the predetermined server, obtaining the anti-obfuscation map file from a predetermined platform, and using the anti-obfuscation map file to perform anti-obfuscation processing for the exception stack.

4. The method according to claim 3, wherein the method further comprises:

after obtaining the anti-obfuscation map file from the predetermined server, storing the anti-obfuscation map file in the local memory if determining that the anti-obfuscation map file meets a storage condition;

after obtaining the anti-obfuscation map file from the predetermined platform, storing the anti-obfuscation map file in the predetermined server, and further storing the anti-obfuscation map file in the local memory if determining that the anti-obfuscation map file meets a storage condition.

5. The method according to claim 4, wherein the method further comprises:

if determining that any anti-obfuscation map file in the local memory is not used within a predetermined duration, deleting the anti-obfuscation map file from the local memory; and/or, when the anti-obfuscation map file is stored in the local memory, determining an anti-obfuscation map file to be replaced according to a predetermined replacement policy, and deleting the anti-obfuscation map file to be replaced from the local memory.

6. The method according to claim 4, wherein the storing the anti-obfuscation map file in the local memory comprises: mapping the anti-obfuscation map file into a form of M sets of HashMap and then store M sets of HashMap into the local memory, M being a positive integer greater than one;

the performing anti-obfuscation processing for the exception stack by using the anti-obfuscation map file stored in the local memory comprises: using the anti-obfuscation map file after the parsing to perform the anti-obfuscation processing for the exception stack.

7. An electronic device, comprising:
at least one processor; and
a memory communicatively connected with the at least one processor;
wherein the memory stores instructions executable by the at least one processor, and the instructions are executed by the at least one processor to enable the at least one processor to perform a method for handling exception stack, wherein the method comprises:
at the level of any executor in a distributed stream-type processing system comprising at least two executors, performing the following processing of:
obtaining at least one exception stack from a message middleware when the executor in an idle state each time, collected exception stacks generated by users being stored in the message middleware;
as for any exception stack, obtain an anti-obfuscation map file corresponding to the exception stack, and perform anti-obfuscation processing for the exception stack by using the anti-obfuscation map file.

8. The electronic device according to claim 7, wherein the obtaining an anti-obfuscation map file corresponding to the exception stack, and performing anti-obfuscation processing for the exception stack by using the anti-obfuscation map file comprises:

if determining that the anti-obfuscation map file is stored in a local memory, performing anti-obfuscation processing for the exception stack by using the anti-obfuscation map file stored in the local memory.

9. The electronic device according to claim 7, wherein the obtaining an anti-obfuscation map file corresponding to the exception stack, and performing anti-obfuscation processing for the exception stack by using the anti-obfuscation map file comprises:

if determining that the anti-obfuscation map file is not stored in the local memory but stored in a predetermined server, obtaining the anti-obfuscation map file from the predetermined server, and using the anti-obfuscation map file to perform anti-obfuscation processing for the exception stack;

if determining that the anti-obfuscation map file is not stored in both the local memory and the predetermined server, obtaining the anti-obfuscation map file from a predetermined platform, and using the anti-obfuscation map file to perform anti-obfuscation processing for the exception stack.

10. The electronic device according to claim 9, wherein the method further comprises:

after obtaining the anti-obfuscation map file from the predetermined server, storing the anti-obfuscation map file in the local memory if determining that the anti-obfuscation map file meets a storage condition;

after obtaining the anti-obfuscation map file from the predetermined platform, storing the anti-obfuscation map file in the predetermined server, and further storing the anti-obfuscation map file in the local memory if determining that the anti-obfuscation map file meets a storage condition.

11. The electronic device according to claim 10, wherein the method further comprises:

if determining that any anti-obfuscation map file in the local memory is not used within a predetermined duration, deleting the anti-obfuscation map file from the local memory; and/or, when the anti-obfuscation map file is stored in the local memory, determining an anti-obfuscation map file to be replaced according to a predetermined replacement policy, and deleting the anti-obfuscation map file to be replaced from the local memory.

12. The electronic device according to claim 10, wherein the storing the anti-obfuscation map file in the local memory comprises: mapping the anti-obfuscation map file into a form of M sets of HashMap and then store M sets of HashMap into the local memory, M being a positive integer greater than one;

the performing anti-obfuscation processing for the exception stack by using the anti-obfuscation map file stored in the local memory comprises: using the anti-obfuscation map file after the parsing to perform the anti-obfuscation processing for the exception stack.

13. A non-transitory computer-readable storage medium storing computer instructions therein, wherein the computer instructions are used to cause the computer to perform a method for handling exception stack, wherein the method comprises:

at the level of any executor in a distributed stream-type processing system comprising at least two executors, performing the following processing of:

obtaining at least one exception stack from a message middleware when the executor in an idle state each time, collected exception stacks generated by users being stored in the message middleware;

as for any exception stack, obtaining an anti-obfuscation map file corresponding to the exception stack, and performing anti-obfuscation processing for the exception stack by using the anti-obfuscation map file.

14. The non-transitory computer-readable storage medium according to claim 13, wherein the obtaining an anti-obfuscation map file corresponding to the exception stack, and performing anti-obfuscation processing for the exception stack by using the anti-obfuscation map file comprises:

if determining that the anti-obfuscation map file is stored in a local memory, performing anti-obfuscation processing for the exception stack by using the anti-obfuscation map file stored in the local memory.

15. The non-transitory computer-readable storage medium according to claim 13, wherein the obtaining an anti-obfuscation map file corresponding to the exception stack, and performing anti-obfuscation processing for the exception stack by using the anti-obfuscation map file comprises:

if determining that the anti-obfuscation map file is not stored in the local memory but stored in a predetermined server, obtaining the anti-obfuscation map file from the predetermined server, and using the anti-obfuscation map file to perform anti-obfuscation processing for the exception stack;

if determining that the anti-obfuscation map file is not stored in both the local memory and the predetermined server, obtaining the anti-obfuscation map file from a predetermined platform, and using the anti-obfuscation map file to perform anti-obfuscation processing for the exception stack.

16. The non-transitory computer-readable storage medium according to claim 15, wherein the method further comprises:

after obtaining the anti-obfuscation map file from the predetermined server, storing the anti-obfuscation map file in the local memory if determining that the anti-obfuscation map file meets a storage condition;

after obtaining the anti-obfuscation map file from the predetermined platform, storing the anti-obfuscation map file in the predetermined server, and further storing the anti-obfuscation map file in the local memory if determining that the anti-obfuscation map file meets a storage condition.

17. The non-transitory computer-readable storage medium according to claim 15, wherein the method further comprises:

if determining that any anti-obfuscation map file in the local memory is not used within a predetermined duration, deleting the anti-obfuscation map file from the local memory; and/or, when the anti-obfuscation map file is stored in the local memory, determining an anti-obfuscation map file to be replaced according to a predetermined replacement policy, and deleting the anti-obfuscation map file to be replaced from the local memory.

18. The non-transitory computer-readable storage medium according to claim 15, wherein the storing the anti-obfuscation map file in the local memory comprises: mapping the anti-obfuscation map file into a form of M sets of HashMap and then store M sets of HashMap into the local memory, M being a positive integer greater than one;

the performing anti-obfuscation processing for the exception stack by using the anti-obfuscation map file stored in the local memory comprises: using the anti-obfuscation map file after the parsing to perform the anti-obfuscation processing for the exception stack.

* * * * *